United States Patent
Miyake et al.

[11] Patent Number: 6,115,778
[45] Date of Patent: Sep. 5, 2000

[54] METHOD AND APPARATUS FOR HANDLING INTERRUPTS THROUGH THE USE OF A VECTOR ACCESS SIGNAL

[75] Inventors: Masakazu Miyake; Moriyasu Banno; Hiroyuki Watanabe, all of Tokyo, Japan

[73] Assignee: Kabushiki Kaisha Toshiba, Kawasaki, Japan

[21] Appl. No.: 09/100,244

[22] Filed: Jun. 19, 1998

[30] Foreign Application Priority Data

Jun. 20, 1997 [JP] Japan ................................. 9-164538

[51] Int. Cl.[7] ................................................. G06F 13/24
[52] U.S. Cl. ................................. 710/260; 262/269
[58] Field of Search ............................. 710/260–269; 712/233, 244

[56] References Cited

U.S. PATENT DOCUMENTS

| | | | |
|---|---|---|---|
| 5,349,667 | 9/1994 | Kaneko | 710/267 |
| 5,590,380 | 12/1996 | Yamada et al. | 710/48 |
| 5,594,905 | 1/1997 | Mital | 710/260 |
| 5,603,035 | 2/1997 | Erramoun et al. | 710/260 |
| 5,659,759 | 8/1997 | Yamada | 710/265 |

OTHER PUBLICATIONS

Tanenbaum, Structured Computer Organization, 1990, pp. 11–13.

*Primary Examiner*—Glenn A. Auve
*Assistant Examiner*—Sumati Lefkowitz
*Attorney, Agent, or Firm*—Oblon, Spivak, McClelland, Maier & Neustadt, P.C.

[57] ABSTRACT

A control system comprises an interrupt controller, having vector access signal output mechanism for outputting a vector access signal, which is activated when a start address is read out from a vector holder, and a central processing unit (CPU), comprising a present mask holder, which holds a present mask level, and a previous mask holder, which holds a previous mask level, wherein the CPU compares the interrupt level and the present mask level, and, when the interrupt level is higher than the present mask level, copies a value of the present mask level holder into the previous mask level holder, reads out a start address of an interrupt processing program corresponding to an accepted interrupt request from the vector holder, starts executing the interrupt processing program, and copies the interrupt level into a present mask level holder by means of an activated vector access signal.

6 Claims, 7 Drawing Sheets

METHOD AND APPARATUS FOR HANDLING INTERRUPTS THROUGH THE USE OF A VECTOR ACCESS SIGNAL

BACKGROUND OF THE INVENTION

1. Field of the Invention

The present invention relates to an interrupt controller for accepting interrupts for a Central Processing Unit (CPU), a computer system having the interrupt controller, and interrupt handling method and storage medium storing program for the interrupt handling method, capable of accepting multiple interrupt request signals.

2. Description of the Related Art

In computer systems, in addition to executing programs sequentially, it is a common method wherein a program being executed is temporarily suspended by an internal or external source, so as to allow another program to be executed. This is termed "interrupt processing" (or simply, an "interrupt"). The temporarily suspended program is restarted after the interrupt processing program has been executed.

In order to realize this type of interrupt processing, at least the following are required: (1) a system for sending an interrupt request to the CPU; (2) a system for suspending the program while preserving the state of the CPU; and (3) a system for notifying the CPU of the start address of the interrupt processing program which processes the requested interrupt. Furthermore, interrupt sources are usually assigned levels (priority levels) in order to prevent important programs being delayed due to interrupt request signals occurring during the execution thereof. Therefore, (4) a level-determining system is also required so that low-level interrupts are not accepted during the execution of high-level processing. And, (5) a system for switching the mask level is required to ensure that, when a high-level interrupt has been generated, interrupts of a lower level than the high-level interrupt are not accepted.

Conventionally, an interrupt controller is connected to the CPU in order to provide these systems. There have been two conventional methods of dividing the functions of the CPU and the interrupt controller.

In a first conventional method, interrupts are executed automatically by the hardware of the CPU and the interrupt controller. This first conventional method will next be explained referring FIG. 1.

Figure 1:
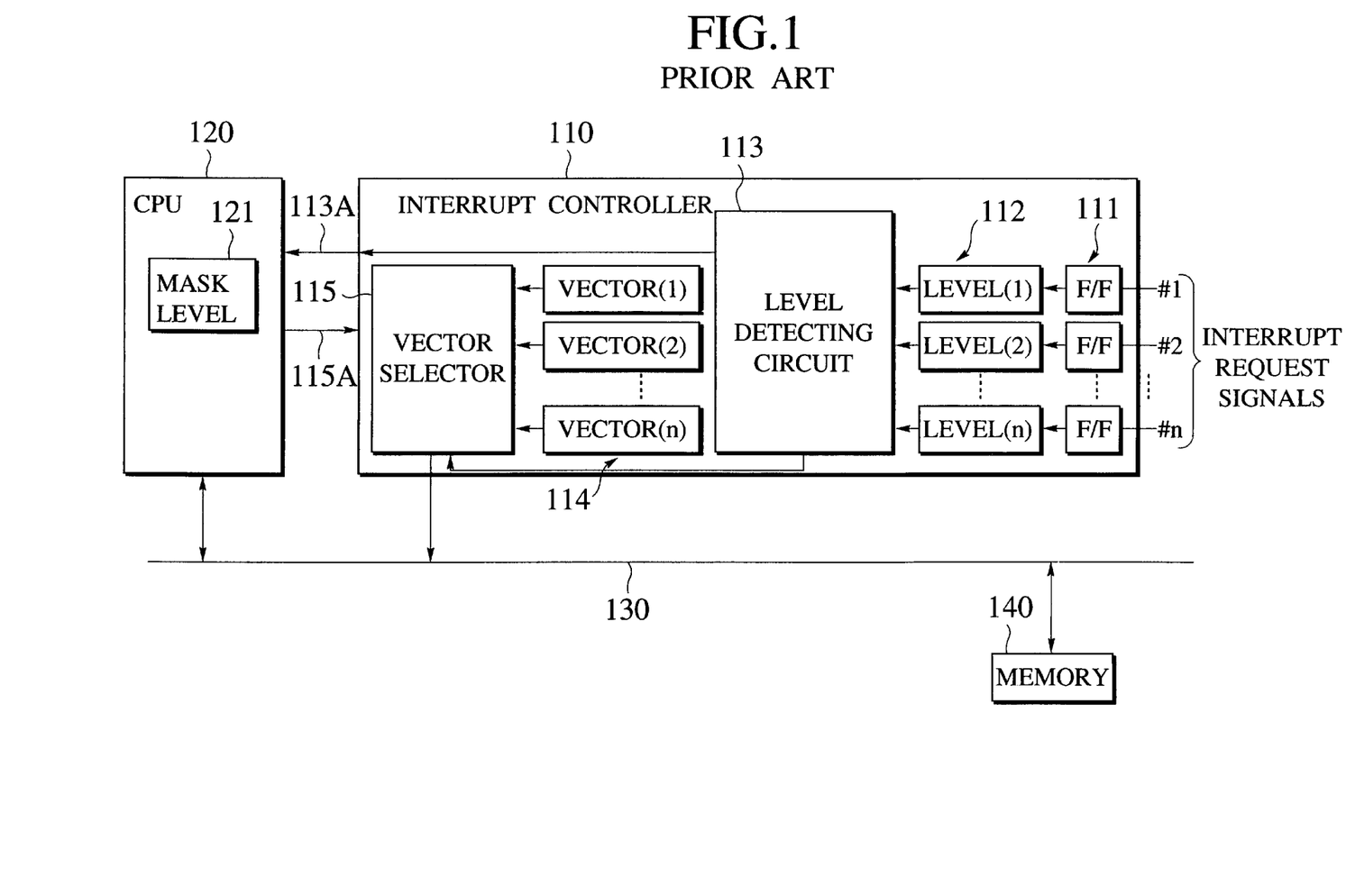
FIG. 1 is a diagram showing a first conventional interrupt control system.

Interrupt request signals #1~#n are accepted via flip-flops 111 and are each allocated levels 112 and vectors (showing the start addresses of the interrupt processing programs) 114. When one or more of these is activated, an interrupt controller 110 deems the highest level among the levels 112 corresponding to the activated interrupt as an interrupt level signal 113A and notifies the CPU 120 by means of a level detecting circuit 113.

The CPU 120 compares the interrupt level 113A with the mask level 121. When the interrupt level is higher, the CPU 120 saves the present state of the CPU 120 via a bus 130 in a memory 140. In addition, vector request signal 115A becomes valid. Then, a vector selector 115, which is provided within the interrupt controller 110, sends a vector 114 which corresponds to the highest level interrupt request to the bus 130.

The CPU 120 reads out the value of this vector from the bus, calculates from this value the start address of the interrupt processing program and proceeds to execute the interrupt processing program. Moreover, the CPU 120 sets the value of the mask level 121 so as to match the value of the interrupt level.

Thus, by performing much of the processing using the hardware, the first method is capable of high-speed processing.

According to a second conventional method, the CPU has few functions for interrupt processing. Instead, interrupts are realized using the hardware and software of the interrupt controller. This second conventional method will next be explained referring FIG. 2.

Figure 2:
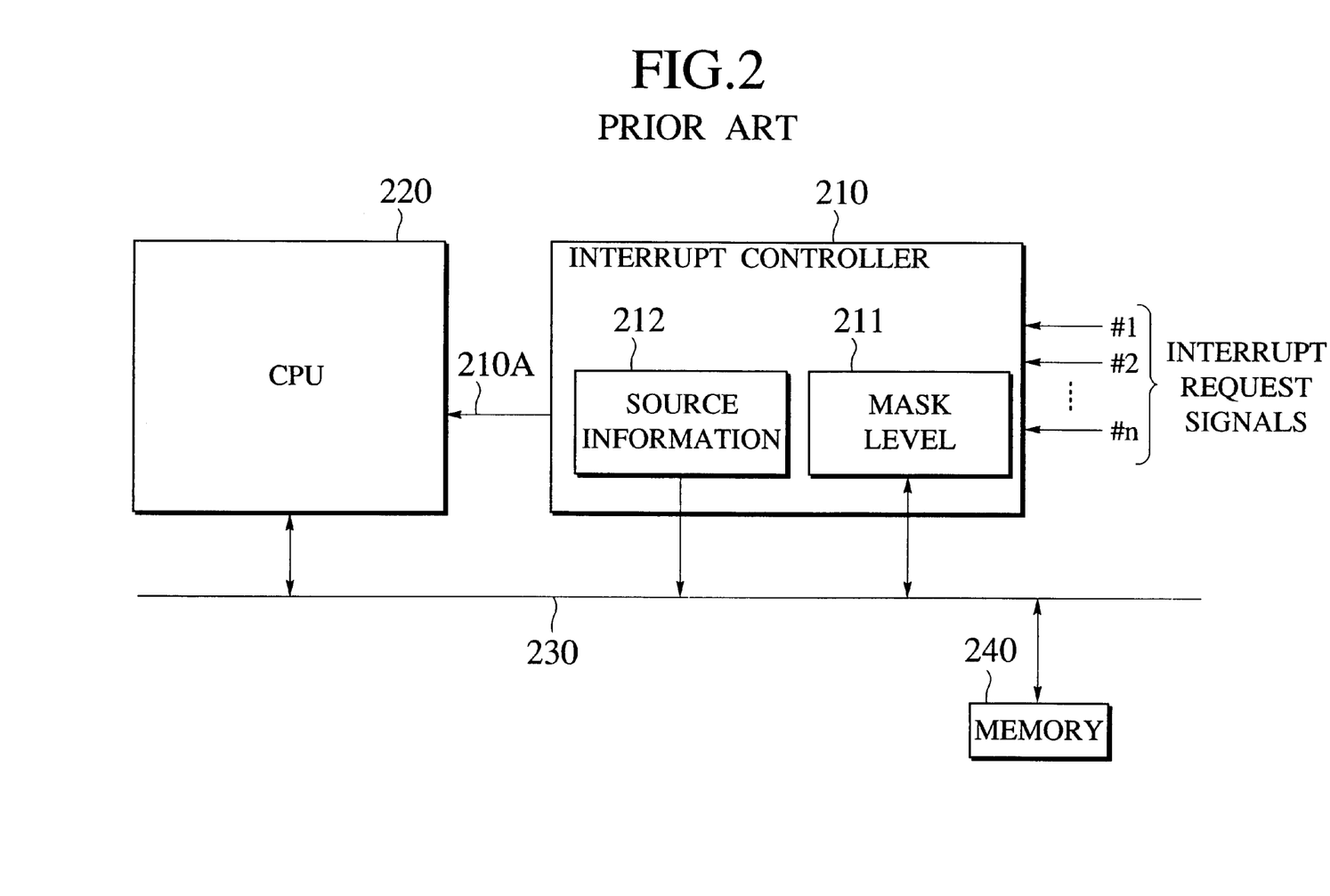
FIG. 2 is a diagram showing a second conventional interrupt control system.

When one or more of the interrupt request signals #1~#n is activated, the interrupt controller 210 compares the interrupt level of the source of the activation with the mask level 211. When the interrupt level of the source is found to be higher, the interrupt controller 210 activates an interrupt notification signal 210A and sends a request for interrupt processing to the CPU 220.

When an interrupt request signal is activated, the CPU 220 commences execution of an interrupt processing program which is stored in the memory 240. This interrupt processing program first saves the current state in the memory. Then the interrupt processing program reads out interrupt source information 212 from the interrupt controller 210, determines the source of the interrupt request from among interrupt request signals #1~#n, and calculates the start address of the interrupt processing program which corresponds to this interrupt source. Then, a value corresponding to the level of this interrupt source is written into the mask level 211, whereafter processing shifts to the start address of the newly calculated interrupt processing program.

Executing much of the processing using programs in this way has advantages of allowing the amount of hardware to be reduced and lowering costs, while offering flexible processing. And, since the CPU state is saved by the program as described above, it is possible to accept other interrupts before saving. However, since the CPU state is destroyed when an interrupt is accepted prior to saving, interrupts are generally prohibited until the CPU state has been preserved.

However, although the first conventional method described above has excellent interrupt response speed (the time from detection of an interrupt request to the commencement of interrupt processing) due to the fact that processing is executed with hardware itself, it does have the disadvantage of inflexible processing. And, although the second conventional method described above needs only a small amount of hardware, much of the processing must be executed using programs. For instance, the source of an interrupt cannot be identified without a program to compare each of the interrupt sources one by one. As a consequence, there is a disadvantage of limited interrupt response speed.

SUMMARY OF THE INVENTION

The present invention has been achieved in order to solve the abovementioned conventional problems. It therefore is an object of the present invention to provide an interrupt controller which is capable of improving interrupt response speed and processing flexibility.

Another object of the present invention is to provide a system having an interrupt controller which is capable of improving interrupt response speed and processing flexibility.

A further object of the present invention is to provide a method for handling an interrupt which is capable of improving interrupt response speed and processing flexibility.

A still further object of the present invention is to provide a storage medium storing a program for handling an interrupt which is capable of improving interrupt response speed and processing flexibility In order to achieve the object, a first aspect of the present invention provides an interrupt controller capable of accepting multiple interrupts, comprising an interrupt request acceptor and a vector holder. The interrupt request acceptor outputs, in response to an activated interrupt request, an interrupt level signal, to which a priority level relating to interrupt processing in an external control unit has been encoded, to the external control unit. The external control unit may be a central processing unit (CPU) in a computer system. The vector holder holds start addresses of an interrupt processing program for executing interrupt Processing corresponding to each of said interrupt requests. And the vector holder is connected via a bus to the external control unit, and when the external control unit initiates the interrupt processing program, the vector holder is read out a start address of an interrupt processing program corresponding to the accepted interrupt request to the external control unit via the bus, and also sends the vector access signal to the external control unit.

According to the first aspect of the present invention, interrupt sources can be identified at high speed since start addresses of the interrupt processing programs are read out from the vector holder. Furthermore, sending a vector access signal to the outside makes it possible to inform the outside of the fact that a start address is being read out from the vector holder.

According to a second aspect of the present invention, a system comprises a central processing unit (CPU) and an interrupt controller. The CPU comprises a present mask level holder for holding a present mask level, a previous mask level holder for holding a previous mask level, and a masking copying system for copying an interrupt level into a present mask level holder. The interrupt controller is capable of accepting multiple interrupt requests, comprises an interrupt request acceptor and a vector holder. The interrupt request acceptor outputs, in response to an activated interrupt request, an interrupt level signal, to which a priority level relating to interrupt request, to the CPU. The vector holder holds start addresses of an interrupt processing program for executing interrupt processings corresponding to each of the interrupt requests. The vector holder further outputs a vector access signal, which is activated when the start address is read out from the vector holder, to the CPU. In the second aspect of the present invention, the CPU compares the interrupt level and the present mask level. When the present mask level is higher, the CPU does not accept the interrupt. When the interrupt level is higher, an address signal and a vector read signal are supplied to the interrupt controller. In the case where the vector is to be read out, the vector access signal is activated. Furthermore, the value of the present mask level holder is copied into the previous mask level holder, whereby the acceptance of low-level interrupts is prohibited. The vector is transferred from the interrupt controller via the bus to the CPU and the interrupt processing program in the memory is initiated. Or, when the interrupt level is higher than or the same as the present mask level, the CPU may copy the value of the present mask level holder into the previous mask level holder, reads out the start address of the interrupt processing program corresponding to then accepted interrupt request from the vector holder, starts executing the interrupt processing program, and adds 1 to the interrupt level before copying the interrupt level into the present mask level holder by means of the activated vector access signal.

According to the second aspect, when an interrupt request has been accepted, the program is able to select information needing to be saved, achieving highly flexible processing. Furthermore, interrupt sources can be identified at high speed since start addresses of the interrupt processing programs are read out from the vector holder.

According to a third aspect of the present invention, a system comprises a central processing unit (CPU), a masking circuit and an interrupt controller. The masking circuit comprises a present mask level holder for holding a present mask level, a previous mask level holder for holding a previous mask level, and a masking copying system for copying an interrupt level into a present mask level holder. The interrupt controller is capable of accepting multiple interrupt requests, comprises an interrupt request acceptor and a vector holder. The interrupt request acceptor outputs, in response to an activated interrupt request, an interrupt level signal, to which a priority level has been encoded, to the CPU. The vector holder holds start addresses of an interrupt processing program for executing interrupts corresponding to each of the interrupt requests. The vector holder further outputs a vector access signal, which is activated when the start address is read out from the vector holder, to the masking circuit. When the interrupt level is higher than the present mask level, the masking circuit copies a value of the present mask level holder into the previous mask level holder, and also reads out a start address of an interrupt processing program, corresponding to an accepted interrupt request from the vector holder. And the CPU starts executing the interrupt processing program, and copies the interrupt level into a present mask level holder by means of an activated vector access signal. And the CPU receives the interrupt notification signal, reads out from the vector holder a start address of an interrupt processing program corresponding to the accepted interrupt request, and starts executing the interrupt processing program. On the contrary, when the interrupt level is higher than or the same as the present mask level, the masking circuit may copy the value of the present mask level holder into the previous mask level holder, reads out the start address of the interrupt processing program corresponding to the accepted interrupt request from the vector holder, and the CPU may start executing the interrupt processing program, adding 1 to the interrupt level before copying the interrupt level into the present mask level holder by means of the activated vector access signal.

The third aspect of the present invention provides the same effectiveness as the second aspect.

According to a fourth aspect of the present invention, A method for handling an interrupt comprises the steps of: activating interrupt request signals; comparing an interrupt level with a present mask level in a present mask level holder, and if the interrupt level is higher, activating a vector access signal and copying a value of the present mask level holder into a previous mask level holder to prohibit an acceptance of low-level interrupts; transferring the vector access signal to a CPU to initiate an interrupt processing program; and setting the interrupt level in the present mask level holder so as not to accept no interrupts lower than the interrupt being presently processed.

According to the fourth aspect of the present invention, the highly flexible processing is achieved. Furthermore, interrupt sources can be identified at high speed.

Finally, the program for executing the interrupt handling methods can be stored in the storage medium. Then, a fifth aspect of the present invention provides a storage medium storing a program for handling an interrupt. The program pertaining to the fifth aspect of the present invention comprises the steps of: activating interrupt request signals; comparing an interrupt level with a present mask level in a present mask level holder, and if the interrupt level is higher, activating a vector access signal and copying a value of the present mask level holder into a previous mask level holder to prohibit an acceptance of low-level interrupts; transferring the vector access signal to a CPU to initiate an interrupt processing program; and setting the interrupt level in the present mask level holder so as not to accept no interrupts lower than the interrupt being presently processed.

The contents of this storage medium can be read by the CPU, which then executes that program, to control the computer system so as to realize a desired interrupt handling method. The storage medium here includes a semiconductor memory, a magnetic disk, an optical disk, a magneto-optical disk, a magnetic tape, and other media capable of storing the program of the present invention.

According to the fifth aspect of the present invention, the highly flexible processing is achieved. Furthermore, interrupt sources can be identified at high speed.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DESCRIPTION OF THE PREFERRED EMBODIMENTS

There will be detailed below the preferred embodiments of the present invention with reference to the accompanying drawings.

First Embodiment

Figure 3:
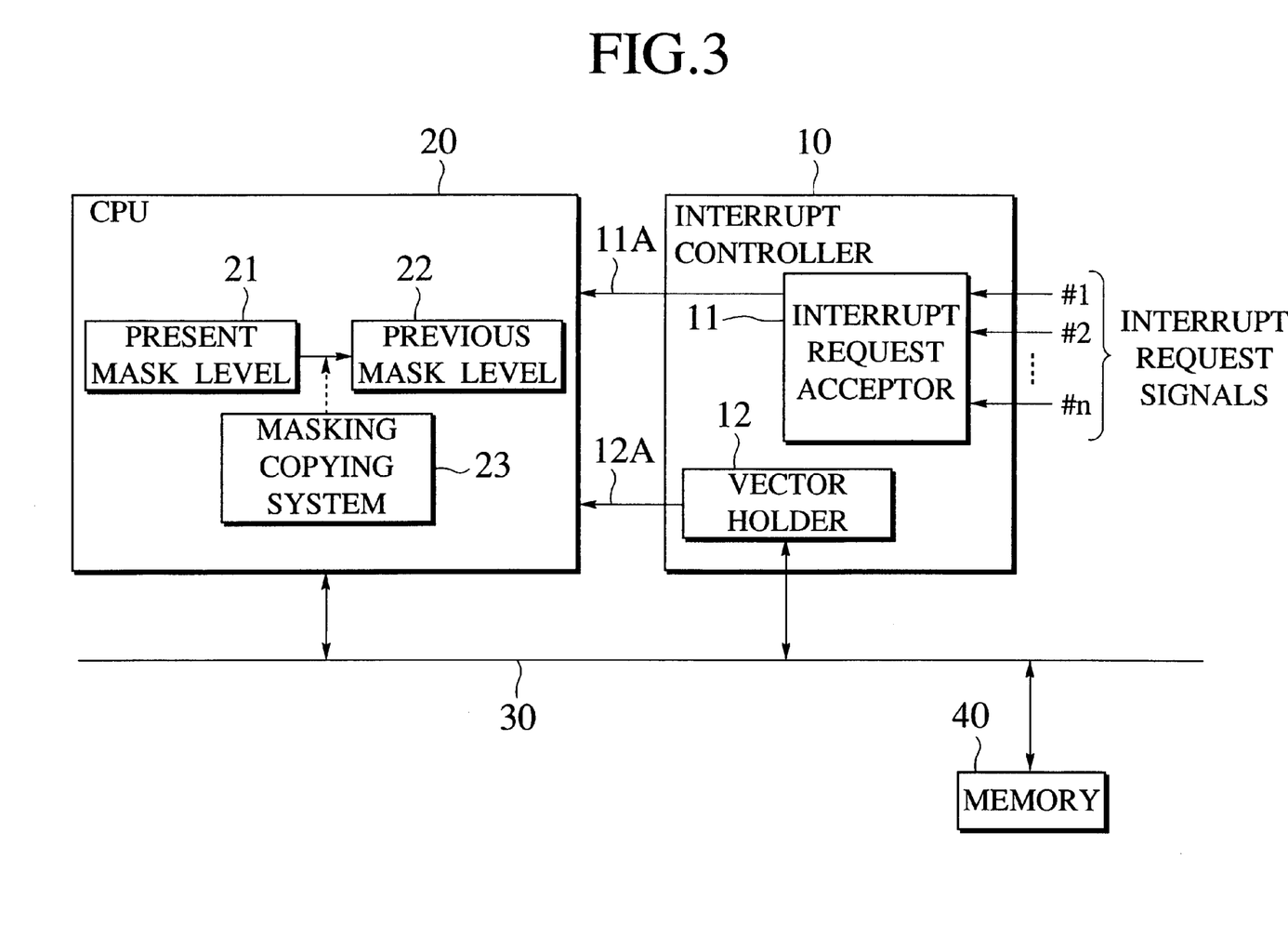
FIG. 3 is a block diagram illustrating a control system according to a first embodiment of the present invention.

FIG. 3 is a block diagram illustrating a control system according to a first embodiment of the present invention.

This control system comprises an interrupt controller 10, a central processing unit (CPU) 20 and a memory 40. The programs such as interrupt processing programs (programs for performing processing corresponding to interrupt sources) and interrupt handling programs for initiating the interrupt processing programs are stored in the memory 40. The interrupt controller 10, the CPU 20 and the memory 40 are connected to a bus 30.

The interrupt controller 10 has an interrupt request acceptor 11, which accepts a plurality of interrupt request signals #1~#n, and a vector holder 12, which holds start addresses of interrupt processing programs for executing interrupts corresponding to the interrupt request signals #1~#n.

The interrupt request acceptor 11 has a system for outputting an interrupt level signal 11A to which a level (priority level) relating to an interrupt to be executed by the CPU 20 has been encoded, in compliance with an activated interrupt request signal. The interrupt request acceptor 11 has, for instance, a configuration as shown in FIGS. 4A and 4B.

Figure 4A:
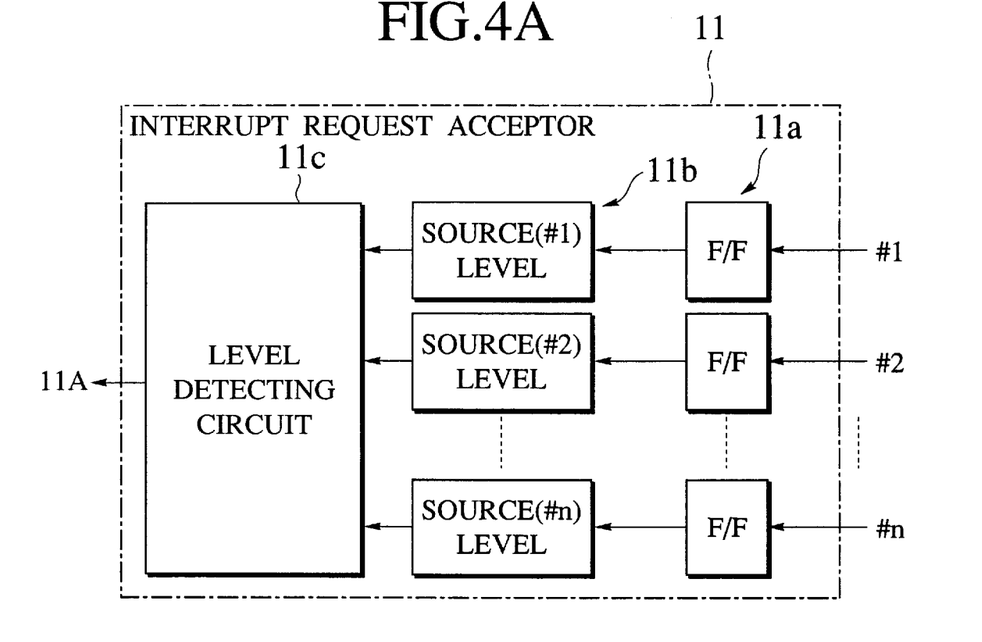
FIGS. 4A and 4B are diagrams showing example configurations of an interrupt request acceptor 11.

In the example shown in FIG. 4A, the interrupt request acceptor 11 comprises edge-triggered flip-flops 11a for detecting each of the interrupt request signals #1~#n, level appenders 11b for outputting set interrupt levels, and a level detecting circuit 11c for outputting the highest interrupt level from among the plurality of interrupt request signals #1~#n as the interrupt level signal 11A.

Figure 4B:
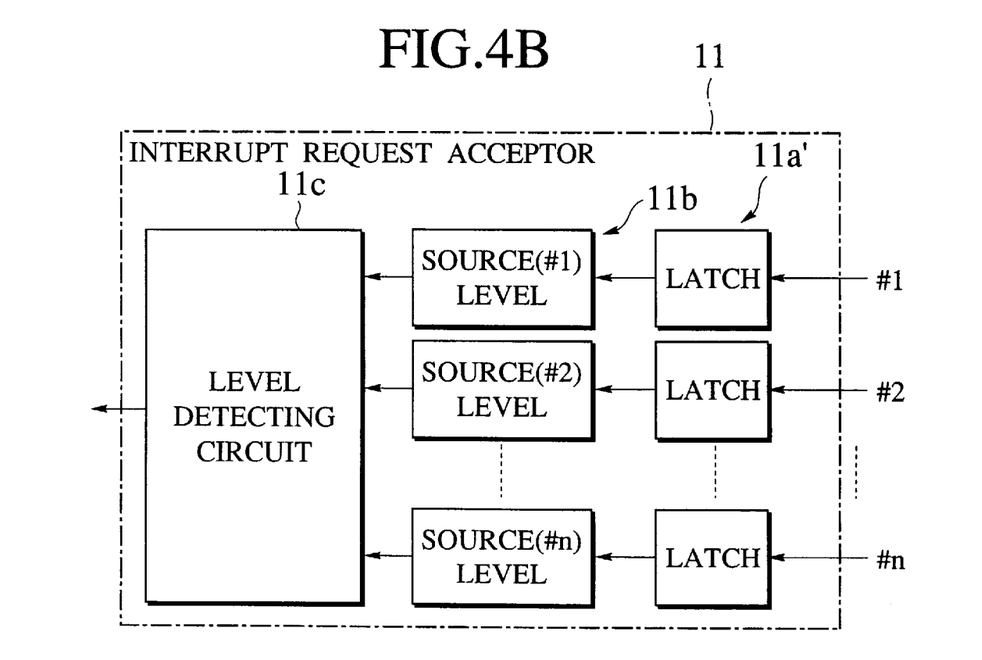

Alternatively, in the example shown in FIG. 4B, the flip-flops 11a are replaced by level-triggered latches 11a' for detecting the interrupt request signals #1~#n.

Turning back to FIG. 3, the vector holder 12 is connected to the CPU 20 via the bus 30. When the CPU 20 initiates an interrupt handling program, the vector holder 12 has a system for reading out the start address of an interrupt processing program which corresponds to the accepted interrupt request and sending this through the bus 30 to the CPU 20. The vector holder 12 has, for instance, the configuration shown in FIG. 5.

Figure 5:
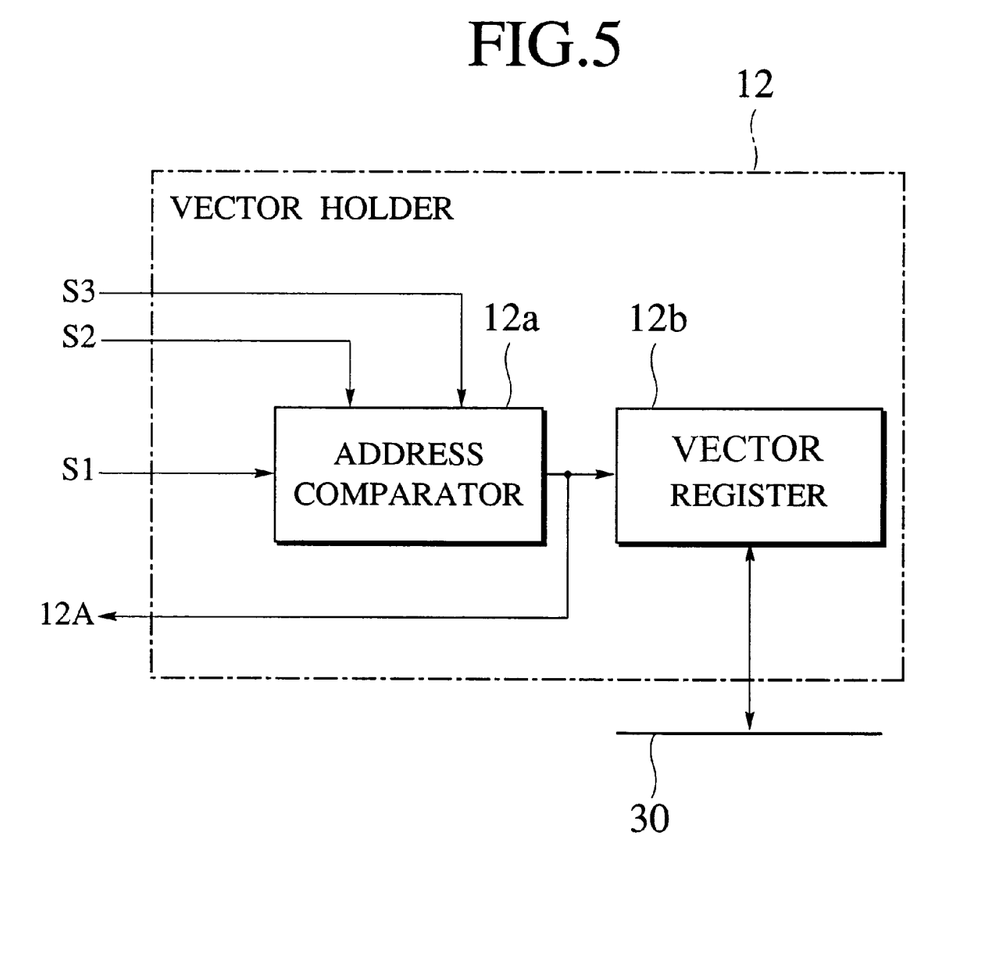
FIG. 5 is a diagram showing one configuration of a vector holder 12.

As FIG. 5 shows, the vector holder 12 comprises an address comparator 12a and a vector register 12b. When a vector read signal S2 is activated, the address comparator 12a compares whether an address signal S1 is equivalent to the start address stored in the vector holder 12. If the address signal S1 is equivalent to the start address stored in the vector holder 12, the address comparator 12a activates a vector access signal 12A in order to notify the acknowledgment of the vector read operation to the CPU 20. When the vector access signal 12A is activated, the vector register 12b sends a vector of interrupt controller 10, which corresponds to a factor with the highest priority level of the interrupt request acceptor 11, to the bus 39 connected to the CPU 20.

As shown in FIG. 3, the CPU 20 comprises a present mask level holder 21, which holds the present mask level, and a previous mask level holder 22, which holds the previous mask level. In addition, the CPU 20 has a masking copying system 23 for copying interrupt level 11A into the present mask level holder 21 when the vector access signal 12A is activated.

Figure 6:
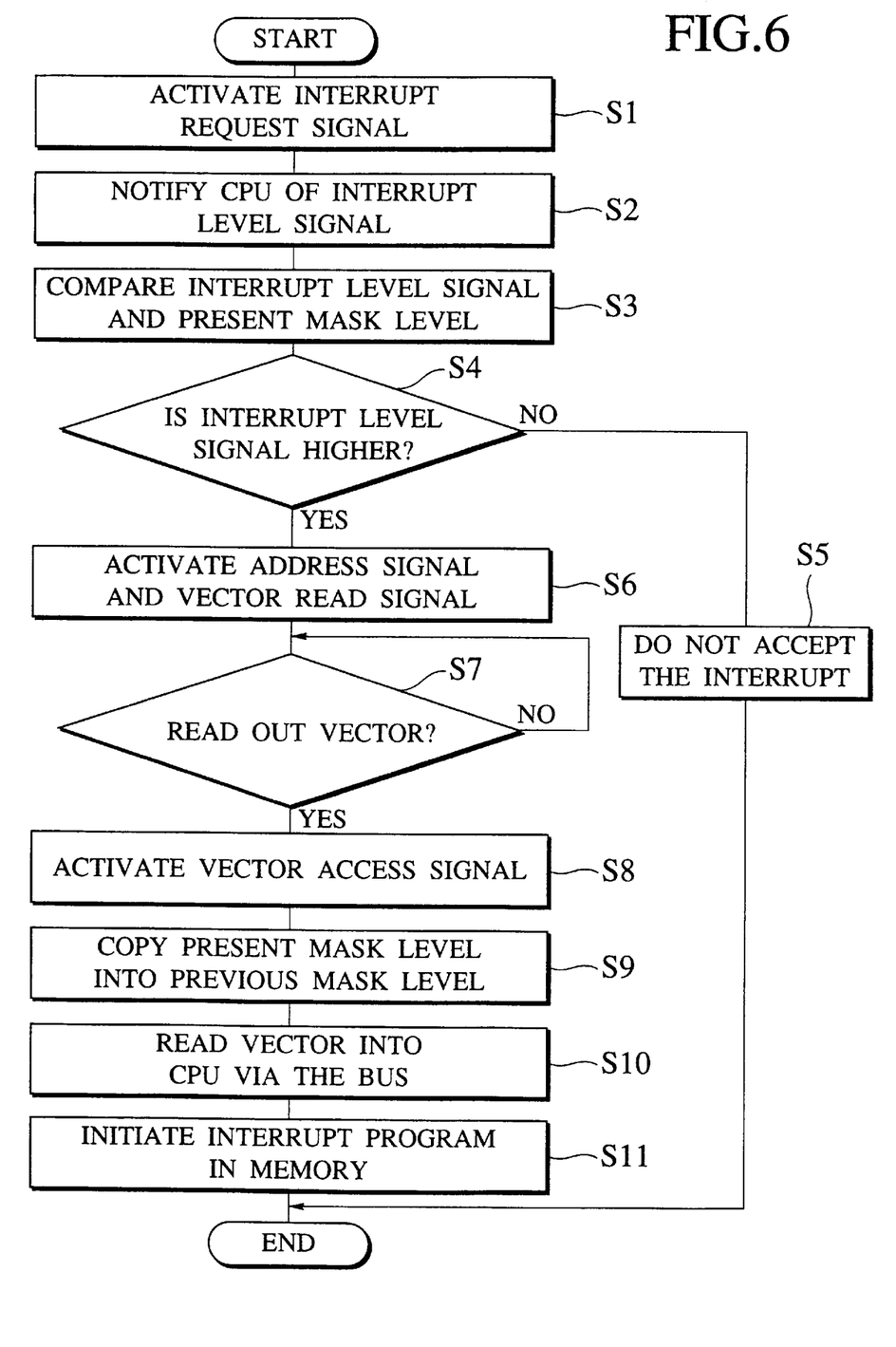
FIG. 6 is a flowchart showing the operation of the first embodiment.

Next, FIG. 6 is a flowchart explaining the operation of the present embodiment.

(a) First, when one or more of the interrupt request signals #1~#n is activated (Step S1), the interrupt controller 10 notifies the CPU 20 of the interrupt request level (interrupt level) using the interrupt level signal 11A (Step S2).

(b) The CPU 20 compares the interrupt level with the present mask level in the present mask level holder 21 (Step S3). When the present mask level is higher (Step S4), the CPU 20 does not accept the interrupt (Step S5). When the interrupt level is higher (Step S4), an address signal and a vector read signal are supplied to the interrupt controller (Step S6).

(c) In the case where the vector is to be read out (Step S7), the vector access signal is activated (Step S8). Furthermore, the value of the present mask level holder 21 is copied into the previous mask level holder 22 (Step S9), whereby the acceptance of low-level interrupts is prohibited. The vector is transferred from the interrupt controller via the bus to the CPU 20 (Step S10) and the interrupt processing program in the memory 40 is initiated (Step S11).

If necessary, the interrupt processing program saves the previous mask level and the like in the memory 40.

And, when the vector is read out, the interrupt controller 10 activates the vector access signal 12A. The CPU 20 receives this vector access signal 12A, sets the interrupt level in the present mask level holder 21 after the vector has been read out. As a result, no interrupts lower than the interrupt which is presently being processed are accepted.

Thus, the first embodiment of the present invention is capable of maintaining roughly the same response speed as the first conventional method, described earlier with the same amount of hardware, while also providing the flexibility of the second conventional method.

In other words, when an interrupt request is accepted, the state at that moment is saved in the memory 40. Here, there are many cases where only the mask level need to be saved. With the first conventional method, a large amount of information had to be saved by hardware in order to handle a large number of cases. Processing which is necessary in other cases (such as saving a stack pointer) is not needed when, for instance, a given interrupt request can be detected.

In the first embodiment of the present invention, the program can select the minimum amount of information which needs to be saved. Consequently, highly flexibly processing is possible. Furthermore, the provision of a system for reading out vectors enables interrupt sources to be identified at high speed.

Second Embodiment

Figure 7:
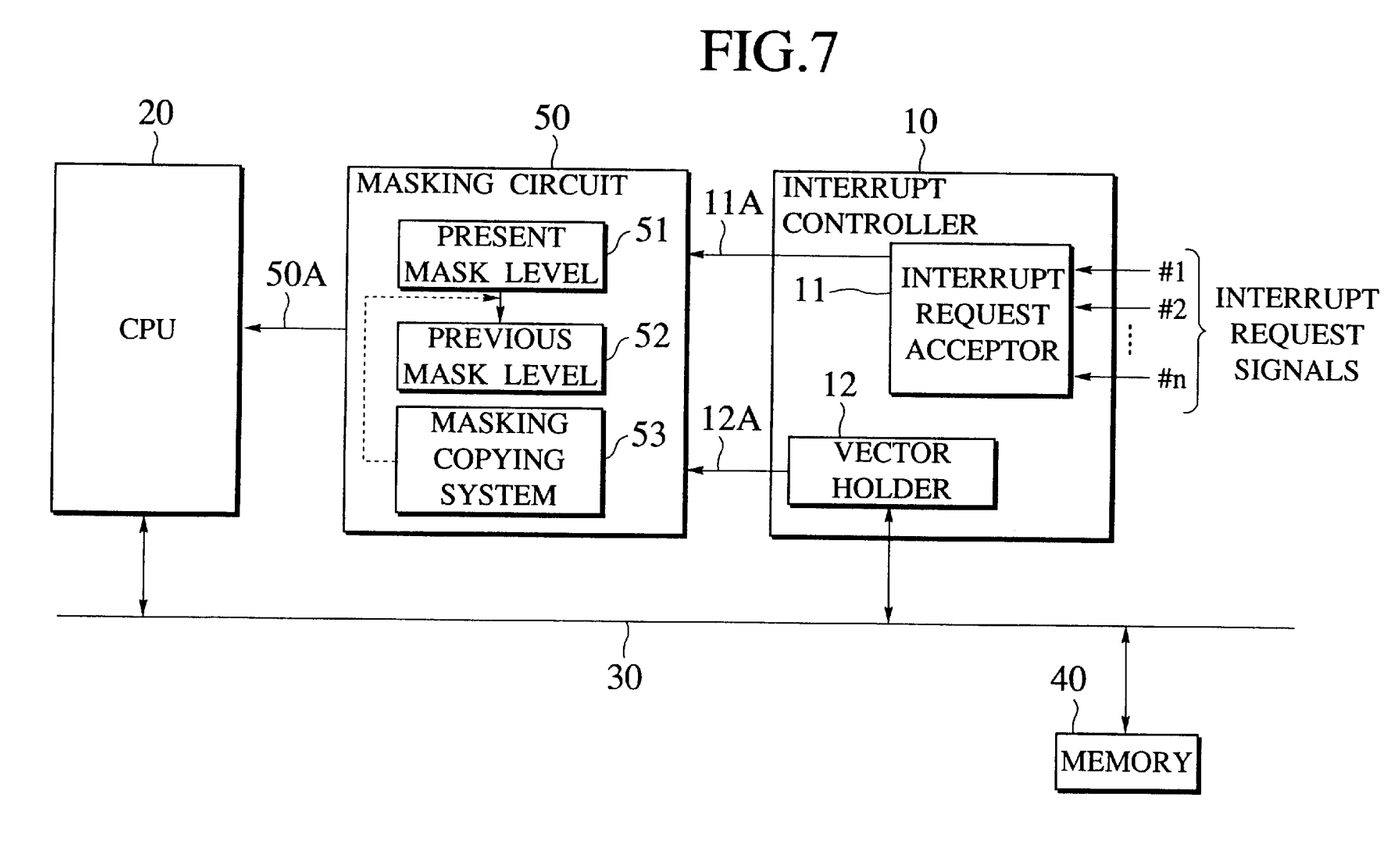
FIG. 7 is a block diagram illustrating a control system according to a second embodiment of the present invention.

FIG. 7 is a block diagram illustrating a control system according to a second embodiment of the present invention.

According to the second embodiment, a masking circuit 50 is provided between the CPU 20 and the interrupt controller 10. The masking circuit 50 comprises a present mask level holder 51, which is equivalent to the present mask level holder 21 of FIG. 1, a previous mask level holder 52, which is equivalent to the previous mask level holder 22, and a masking copying system 53 which is equivalent to the masking copying system 23.

This configuration achieves the same effectivenesses as the first embodiment already described.

Storage Medium Storing Program For Interrupt Handling

Also, the program for executing interrupt handling methods can be stored in a storage medium. The contents of this storage medium can be read by the CPU, which then executes that program, to control the computer system so as to execute a desired interrupt handling method explained in the first and second embodiments. The storage medium here includes a semiconductor memory, a magnetic disk, an optical disk, a magneto-optical disk, a magnetic tape, and other media capable of storing the program.

According to the first and second embodiments, the present invention can be accomplished whether or not interrupts are accepted when the mask level and the interrupt level are the same. When an interrupt is to be accepted, the value to be set in the present masking holder when reading out a vector is calculated by adding 1 to the interrupt level. When an interrupt is not to be accepted, the value to be set is the same as the interrupt level.

As explained above, the present invention is capable of maintaining excellent interrupt response speed, as well as offering flexible processing, with the same amount of hardware as the conventional system.

Various modifications will become possible for those skilled in the art after receiving the teachings of the present disclosure without departing from the scope thereof.

What is claimed is:

1. An interrupt controller comprising:
   an interrupt request acceptor which outputs, in response to an activated interrupt request signal, an interrupt level signal, to which a priority level relating to interrupt processing in an external control unit has been encoded, to the external control unit; and
   a vector holder which holds start addresses of an interrupt processing program for executing interrupt processing corresponding to each of the interrupt request signals, and outputs a vector access signal to the external control unit, the vector access signal is activated when the start address is read out from the vector holder,
   said vector holder is connected via a bus to said external control unit, and when said external control unit initiates said interrupt processing program, said vector holder is read out a start address of an interrupt processing program corresponding to the accepted interrupt request and sends said the vector access signal to said external control unit.

2. The interrupt controller of claim 1, wherein said interrupt request acceptor comprising:
   a plurality of edge-triggered flip-flops for detecting said interrupt request signals;
   level appenders connected said edge-triggered flip-flops respectively, for outputting set interrupt levels, respectively; and
   a level detecting circuit connected said level appenders, for outputting the highest interrupt level from among the plurality of interrupt request signals as the interrupt level signal.

3. The interrupt controller of claim 1, wherein said interrupt request acceptor comprising:
   a plurality of edge-triggered latches for detecting said interrupt request signals;
   level appenders connected said edge-triggered latches respectively, for outputting set interrupt levels, respectively; and
   a level detecting circuit connected said level appenders, for outputting the highest interrupt level from among the plurality of interrupt request signals as the interrupt level signal.

4. The interrupt controller of claim 2, wherein said vector holder comprises:
   an address comparator configured to compare whether an address signal is equivalent to the start address stored in the vector holder when a vector read signal is activated, and to activate the vector access signal, if the address signal is equivalent to the start address; and
   a vector register configured to supply a vector which corresponds to a factor with the highest priority level of the interrupt request acceptor to a bus connected to the external control unit when the vector access signal is activated.

5. The interrupt controller of claim 3, wherein said vector holder comprises:
   an address comparator configured to compare whether an address signal is equivalent to the start address in the vector holder when a vector read signal is activated; and
   a vector register configured to supply a vector which corresponds to a factor with the highest priority level of the interrupt request acceptor to a bus connected to the external control unit when a vector access signal is activated.

6. A method for handling an interrupt comprising the steps of:

(a) activating a plurality of interrupt request signals;

(b) comparing an interrupt level signal, which corresponds to a highest interrupt level among the plurality of interrupt request signals, with a present mask level in a present mask level holder, and if the interrupt level signal is higher, providing an address signal and a vector read signal to an address comparator;

(c) if the activated address signal is equivalent to a start address stored in a vector holder, the address comparator activates a vector access signal so as to notify an acknowledgment of a vector read operation to a central processing unit, and copies a value of the present mask level holder into a previous mask level holder to prohibit an acceptance of low-level interrupts;

(d) transferring said vector access signal to the central processing unit to initiate an interrupt processing program; and (e) setting the interrupt level in the present mask level holder so as not to accept interrupts lower than the interrupt being presently processed.

* * * * *